Patented Apr. 22, 1947

2,419,211

UNITED STATES PATENT OFFICE 2,419,211

TALL OIL TREATMENT

George C. Harris, Wilmington, Del., assignor to Hercules Powder Company, Wilmington, Del., a corporation of Delaware No Drawing. Application May 25, 1945, Serial No. 595,887

9 Claims. (Cl. 260—97.5)

This invention relates to tall oil and more particularly to a method of separating the resin acids from tall oil.

Tall oil is a by-product in the manufacture of paper pulp by digestion of wood with alkaline liquors such as alkaline solutions of sodium sulfide. Crude tall oil consists of a mixture of resin and fatty acids in roughly equal proportions together with minor amounts of neutral, unsaponifiable materials containing mainly plant sterols.

Many methods have been employed in an attempt to isolate the resin acids of tall oil from the fatty acids and neutral bodies. Among the methods proposed for this purpose may be mentioned fractional crystallization, fractional distillation in vacuum or with superheated steam, selective extraction, selective esterification and selective acidification of the resin and fatty acid soaps. None of these methods has proved commercially successful, however, because effective separation was not obtained in most cases, and in those cases where separation was efficient the processes were so complicated that they were not feasible from a practical standpoint.

Now, in accordance with this invention, it has been found that an efficient, economical and simple method of separating the resin acids from tall oil may be effected by preferentially precipitating the resin acids as the amine salts of certain primary organic amines; namely, cyclohexylamine, p-dodecahydroxenylamine and 2-amino-2-methyl-1-propanol. In contrast to the prior art methods, which did not produce resin acid fractions of more than 80% purity, the present method by one precipitation alone gives a resin acid fraction of 93–94% purity, and by one or two repetitions of the precipitation, which is simple to carry out, a substantially 100% resin acid fraction is obtained.

In carrying out the process of this invention, the tall oil is dissolved in a solvent such as acetone and the amine added to the tall oil solution, either per se or as a solution in the same solvent used to dissolve the tall oil. An amount of the amine is added theoretically sufficient to neutralize all of the acids present in the tall oil. On addition of the amine heat is developed and the amine salts of the resin acids precipitate at once. The suspension of the salts in the tall oil solution is agitated well, cooled, and the salts filtered and washed with additional solvent until the wash liquors are colorless. The amine salts of the resin acids are then decomposed either with heat or acid to regenerate the free acids and recover the amine.

Now having generally outlined the embodiments of this invention, the following examples constitute specific illustrations. All amounts are based on parts by weight.

Example 1

Twenty-five parts of tall oil having an acid number of 166 and containing approximately 46% resin acids was dissolved in 40 parts of acetone and to the resulting solution was added 10 parts of cyclohexylamine dissolved in 10 parts of acetone. Heat developed in the reaction mixture and the cyclohexylamine salts of the resin acids precipitated immediately. The precipitated cyclohexylamine salts were filtered from the acetone solution and washed and slurried with fresh acetone to obtain 15.9 parts of the salts. The salts then were suspended in ether and decomposed with dilute aqueous hydrochloric acid to obtain in the ether 12.0 parts (48% based on the tall oil) of resin acids having an acid number of 185 and a color of I on the rosin scale.

Example 2

Twenty-five parts of tall oil having an acid number of 166 and containing approximately 46% resin acids was dissolved in 35 parts of acetone and to the resulting solution was added 15 parts of cyclohexylamine dissolved in 15 parts of acetone. Following the procedure in Example 1 there were obtained 14.5 parts of the cyclohexylamine salts of the resin acids and 10.9 parts (43.6% based on the tall oil and 94.8% based on the approximate amount of resin acids in the tall oil) of resin acids having an acid number of 185 and a color of I on the rosin scale.

Example 3

Twenty-five parts of tall oil having an acid number of 166 and containing approximately 46% resin acids was dissolved in 35 parts of acetone and to the resulting solution was added 15 parts of cyclohexylamine dissolved in 15 parts of acetone. Heat developed in the reaction mixture and the cyclohexylamine salts of the resin acids precipitated at once. The precipitated cyclohexylamine salts were filtered from the acetone solution and washed on the filter with small amounts of fresh acetone. There was obtained 14.3 parts of the salts which then were suspended in ether and decomposed with dilute aqueous hydrochloric acid to obtain in the ether 10.4 parts (41.6% based on the tall oil and 90.5% based on the approximate amount of resin acids in the tall oil) of resin acids having an acid number of 185 and a color of I on the rosin scale.

*Example 4*

The procedure of Example 3 was followed using 25 parts of tall oil dissolved in 40 parts of acetone and 10 parts of cyclohexylamine dissolved in 10 parts of acetone. There were obtained 14.3 parts of the salts and 10.6 parts (42.5% based on the tall oil) of resin acids.

*Example 5*

The procedure of Example 3 was followed using 25 parts of tall oil dissolved in 45 parts of acetone and 5 parts of cyclohexylamine dissolved in 5 parts of acetone. There were obtained 13.6 parts of the salts and 10.1 parts (40.5% based on the tall oil) of resin acids.

*Example 6*

The procedure of Example 3 was followed using 25 parts of tall oil dissolved in 42 parts of acetone and 8 parts of cyclohexylamine dissolved in 8 parts of acetone. There were obtained 14 parts of the salts and 12 parts (48% based on the tall oil) of resin acids.

*Example 7*

With one exception the procedure of Example 3 was followed using 50 parts of tall oil dissolved in 80 parts of acetone and 20 parts of cyclohexylamine dissolved in 20 parts of acetone. There were obtained 28.3 parts of the salts and 21.3 parts (42.6% based on the tall oil) of resin acids. Instead of decomposing the salts according to the process in Example 3, they were decomposed by heating them between 185° C. and 190° C. and sparging off the cyclohexylamine with steam.

*Example 8*

Twenty-five parts of tall oil having an acid number of 166 and containing about 46% resin acids was dissolved in 40 parts of isopropanol and to the resulting solution was added 10 parts of cyclohexylamine dissolved in 10 parts of isopropanol. Heat developed in the reaction mixture and the cyclohexylamine salts of the resin acids precipitated almost instantaneously. The precipitated salts were filtered from the alcohol solution, washed with small amounts of acetone and 13.4 parts of the salts so obtained. The salts were suspended in Hi-Flash naphtha and decomposed with dilute aqueous acetic acid to obtain in the naphtha 9.5 parts (38% based on the tall oil) of resin acids having an acid number of 185 and a color of I on the rosin scale.

*Example 9*

Twenty-five parts of tall oil having an acid number of 166 and containing approximately 46% resin acids was dissolved in 40 parts of acetone and to the resulting solution was added 10 parts of 2-amino-2-methyl-1-propanol dissolved in 10 parts of acetone. Heat developed in the reaction mixture and the 2-amino-2-methyl-1-propanol salts of the resin acids precipitated slowly. The precipitated salts were filtered from the acetone solution and washed on the filter with small amounts of fresh acetone to obtain 8.1 parts of the salts. The salts were dissolved in Hi-Flash naphtha at the reflux temperature of the latter, causing decomposition of the salts. The 2-amino-2-methyl-1-propanol so liberated was distilled from the solution with part of the solvent. The solvent then was evaporated completely under vacuum to obtain 6.3 parts (25.2% based on the tall oil) of resin acids having an acid number of 185 and a color of I on the rosin scale.

*Example 10*

Twenty-five parts of tall oil having an acid number of 166 and containing about 46% resin acids was dissolved in 34 parts of acetone and to the resulting solution was added 16 parts of p-dodecahydroxenylamine dissolved in 16 parts of acetone. Following the procedure in Example 3, there were obtained 19.7 parts of the p-dodecahydroxenylamine salts of the resin acids and 11.6 parts (46.5% based on the tall oil) of resin acids. The resin acid material was somewhat softer than that obtained through the use of cyclohexylamine and had an acid number of 184 to 185 and a bromine number of 100, indicating the presence of some fatty acids.

*Example 11*

Seventy-five parts of tall oil having an acid number of 166 was dissolved in 120 parts of acetone and to the resulting solution was added 30 parts of cyclohexylamine dissolved in 30 parts of acetone. Heat developed and the cyclohexylamine salts of the resin acids precipitated immediately. The solution containing the precipitated salts was cooled to 0° C., agitating the suspension while cooling. The salts then were filtered and washed with fresh acetone until the wash liquors were colorless. The salts were dried to obtain 43.4 parts of a grey-colored material which was decomposed to liberate 32.8 parts (43.8% based on the tall oil) of resin acids by suspending the material in ether and treating the suspension with dilute aqueous hydrochloric acid. The resin acids had an acid number of 185, a bromine number of 133, a color of F on the rosin scale and, as indicated by ultraviolet absorption spectrum, a content of 48% abietic acid-type acids.

The resin acids were treated again with cyclohexylamine according to the above procedure with the exception that Hi-Flash naphtha was used as the initial solvent. Based on the original amount of resin acids a yield of 94% recovered acids was obtained, these acids having an acid number of 185 and being H in color on the rosin scale. The residual material consisted of fatty acids having a bromine number between 91 and 92. A third treatment with cyclohexylamine resulted in quantitative recovery of the resin acids.

Although the examples have shown the use of only one particular grade of tall oil, any grade may be used, no matter how great or small the resin acid content. It should be noted that the percentage of resin acids contained in the tall oil used in the examples was only an approximation made prior to carrying out the amine treatment, and that actually, as shown by Example 1, the tall oil contained a greater amount of resin acids than originally indicated.

The amines operable in accordance with this invention are the three primary amines, cyclohexylamine, p-dodecahydroxenylamine and 2-amino-2-methyl-1-propanol. Cyclohexylamine is preferred. The amines are used in approximately molar quantities per mole of total acids present in the tall oil as calculated from the acid number of the tall oil. By such a calculation an amount of amine at least theoretically equivalent to the amount of resin acids present is insured. Excess amine may be used without causing either an increase or decrease in the yield of the amine salts of the resin acids, but an amount of amine insufficient to precipitate all of the resin acids should be avoided.

The examples have set forth the use of acetone and isopropanol as solvents for the tall oil during the amine treatment. Two other solvents have been found to be satisfactory, these being Hi-Flash naphtha and gasoline. Acetone is the preferred solvent. The gasoline is preferably substantially free of aromatic hydrocarbons, and a particularly applicable material is a gasoline fraction boiling between 96° C. and 127° C. and having a minimum aniline point of 60° C., the latter value indicating that substantially no aromatic hydrocarbons are present. Hi-Flash naphtha is a coal tar hydrocarbon solvent containing a high percentage of aromatic compounds. Its boiling point ranges from 144° C. to 189° C. and it is the distillation cut collected from coal tar after the xylenes have distilled. With all solvents a final ratio of about 2 parts of solvent to about 1 part of tall oil is preferred.

The amine may be added to the tall oil solution either as such or as a solution in the same solvent used to dissolve the tall oil. If a solution of the amine is not used, addition of the amine should be gradual, since a high concentration of the amine in the tall oil solution causes a vigorous reaction. Preferably, as shown by the examples, the amine is added to the tall oil solution as a solution in the same solvent. It is convenient to use about a 50% solution of the amine, although other concentrations are operable. It has been pointed out that a final ratio of about 2 parts of solvent to about 1 part of tall oil is preferred, and it is convenient to dissolve the amine in a portion of the solvent used with the tall oil and by addition of the amine solution to bring the total amount of solvent up to the correct ratio. During addition of the amine agitation may be employed to insure thorough contact of the reaction components.

The formation of the amine salts is an exothermic reaction and the temperature of the reaction mixture should be maintained between about −10° C. and about 50° C. during addition of the amine. The preferable temperature range is between about 10° C. and about 30° C., and the most applicable temperature is 25° C. Unless the temperature is maintained within these limits the reaction is too vigorous. Furthermore, the suspension of the amine salts in the mother liquor is cooled to a temperature between about −10° C. and about 20° C. before the salts are filtered, since the salts, depending upon the particular solvent used, are more or less soluble therein at temperatures above 20° C. A temperature between about 0° C. and about 10° C. may be conveniently obtained using an ice bath. During the cooling process agitation of the suspension may be carried out.

The amine salts may be separated from the reaction mixture by any of the accepted methods, such as filtration or centrifugation. After the separation the salts may be washed with fresh solvent until the wash liquors are colorless. Small amounts of wash solvent should be used and it is somewhat undesirable to form a slurry of the salts in the solvent, since some solubilization loss may then be incurred. The salts then may be dried.

To decompose the amine salts three different procedures may be utilized. Example 7 shows decomposition at the melting point, 185° C. to 190° C., by heat and sparging off the amine with steam. In place of steam, nitrogen, carbon dioxide or a similar gas may be used. Example 9 shows decomposition by dissolving the salts in Hi-Flash naphtha at the reflux temperature of the latter. The reflux temperature of the naphtha is sufficiently high that the heat effects decomposition of the salts. The remaining examples show decomposition by suspending the salts in Hi-Flash naphtha or ether and treating them with dilute hydrochloric or acetic acid. Other acids, such as phosphoric, chloroacetic and the like also may be utilized, and narrow-range gasoline may be employed instead of the Hi-Flash naphtha or ether.

As shown in Example 11 the resin acids may be reprecipitated as the amine salts to remove any contamination from fatty acids and also effect some color improvement.

The tall oil solution remaining after precipitation of the resin acids may be processed to recover the fatty acids and neutral bodies using any standard procedure. For example, in case a water-miscible solvent is used to dissolve the original tall oil, this is replaced by a water-immiscible solvent such as ether. The ether solution containing the fatty acids and neutral bodies is then extracted with a dilute acid to remove any excess amine and the resulting amine salts neutralized with a base to recover the amine. The ether solution, now containing only the fatty acids and neutral bodies, is extracted with dilute aqueous alkali to remove the fatty acids as their soaps, the aqueous layer then being acidified to liberate the free fatty acids. By extraction of the aqueous layer with ether the fatty acids are concentrated in the ether, from which they may be recovered by evaporation of the solvent. The original ether solution, now containing only the neutral bodies, is evaporated to recover these bodies, mainly sterols and higher alcohols.

The principles and process of this invention may be applied to the alkaline solution of the soaps of resin and fatty acids obtained directly from the digestion of the wood. In this case the alkaline solution is extracted with a water-immiscible solvent such as ether, Hi-Flash naphtha, gasoline, benzene, toluene, xylene and the like to remove the neutral bodies. The solvent extract is then evaporated to obtain the neutral bodies, sterols and higher alcohols, and the aqueous alkaline solution is acidified with a suitable mineral or organic acid to liberate the free resin and fatty acids. The separation of the resin and fatty acids is then effected by dissolving the acids in a suitable solvent such as acetone and carrying out the amine treatment as it has previously been described.

The process of this invention is based upon the fact that the amines react readily with the acids contained in tall oil to form substituted ammonium salts of the acids and the fact that only the resin acid amine salts are insoluble in the solvents shown. The amine salts of the fatty acids undoubtedly exist within the solution but are not of sufficient insolubility to precipitate. From a consideration of the above it is quite apparent that the process depends upon the use of an amine which will, in certain solvents, form an insoluble salt only with the resin acids of tall oil. The amine salts are formed by a direct reaction between the amino group of the amine and the carboxyl group of the resin acid.

By the process of this invention a practical and economical means of separating the resin acids from tall oil is provided. Constant regeneration of the amine and efficient recovery of the solvent are feasible aspects of the process. Since there are innumerable uses for both the resin and fatty acids found in tall oil, the exploitation of the latter material according to this process opens up a new source of the acids. The process produces resin acids having acid numbers of about 180 to about 190, bromine numbers of about 100 to about 150 and colors on the rosin scale between about F and about I, thereby providing acids comparable to those obtained directly from wood.

What I claim and desire to protect by Letters Patent is:

1. The method of separating the resin acids from tall oil which comprises dissolving tall oil in an organic solvent selected from the group consisting of acetone, isopropanol, Hi-Flash naphtha and gasoline, and precipitating the resin acids from the resulting solution at a temperature between about −10° C. and about 50° C. with a primary organic amine selected from the group consisting of cyclohexylamine, p-dodecahydroxyenylamine and 2-amino-2-methyl-1-propanol.

2. The method of separating the resin acids from tall oil which comprises dissolving tall oil in an organic solvent selected from the group consisting of acetone, isopropanol, Hi-Flash naphtha and gasoline, precipitating the resin acids from the resulting solution at a temperature between about −10° C. and about 50° C. with a primary organic amine selected from the group consisting of cyclohexylamine, p-dodecahydroxyenylamine and 2-amino-2-methyl-1-propanol, separating the resin acid amine salts so formed from said solution, and decomposing said salts to liberate the free resin acids.

3. The method of separating the resin acids from tall oil which comprises extracting the neutral bodies from a tall oil soap solution with a water-immiscible solvent, acidifying said soap solution with an acid, dissolving the resin and fatty acids so formed in an organic solvent selected from the group consisting of acetone, isopropanol, Hi-Flash naphtha and gasoline, and precipitating the resin acids from the resulting solution at a temperature between about −10° C. and about 50° C. with a primary organic amine selected from the group consisting of cyclohexylamine, p-dodecahydroxenylamine and 2-amino-2-methyl-1-propanol.

4. The method of separating the resin acids from tall oil which comprises dissolving tall oil in an organic solvent selected from the group consisting of acetone, isopropanol, Hi-Flash naphtha and gasoline, and precipitating the resin acids from the resulting solution at a temperature between about 10° C. and about 30° C. with a primary organic amine selected from the group consisting of cyclohexylamine, p-dodecahydroxenylamine and 2-amino-2-methyl-1-propanol.

5. The method of separating the resin acids from tall oil which comprises dissolving tall oil in acetone and precipitating the resin acids from the acetone solution at a temperature between about −10° C. and about 50° C. with a primary organic amine selected from the group consisting of cyclohexylamine, p-dodecahydroxenylamine and 2-amino-2-methyl-1-propanol.

6. The method of separating the resin acids from tall oil which comprises dissolving tall oil in acetone and prepitating the resin acids from the acetone solution with cyclohexylamine at a temperature between about −10° C. and about 50° C.

7. The method of separating the resin acids from tall oil which comprises dissolving tall oil in acetone and precipitating the resin acids from the acetone solution with cyclohexyalmine at a temperature between about 10° C. and about 30° C.

8. The method of separating the resin acids from tall oil which comprises dissolving tall oil in acetone and precipitating the resin acids from the acetone solution with p-dodecahydroxenylamine at a temperature between about −10° C. and about 50° C.

9. The method of separating the resin acids from tall oil which comprises dissolving tall oil in acetone and precipitating the resin acids from the acetone solution with 2-amino-2-methyl-1-propanol at a temperature between about −10° C. and about 50° C.

GEORGE C. HARRIS.

---

Disclaimer 2,419,211.—*George C. Harris*, Wilmington, Del. TALL OIL TREATMENT. Patent dated Apr. 22, 1947. Disclaimer filed Nov. 30, 1949, by the assignee, *Hercules Powder Company*.

Hereby disclaims claims 6 and 7 of said patent; also disclaims all methods of separating the resin acids from tall oil covered by claims 1 to 5, inclusive, except those in which a primary amine selected from the group consisting of p-dodecahydroxenylamine and 2-amino-2-methyl-1-propanol is employed.

[*Official Gazette December 27, 1949.*]

vent are feasible aspects of the process. Since there are innumerable uses for both the resin and fatty acids found in tall oil, the exploitation of the latter material according to this process opens up a new source of the acids. The process produces resin acids having acid numbers of about 180 to about 190, bromine numbers of about 100 to about 150 and colors on the rosin scale between about F and about I, thereby providing acids comparable to those obtained directly from wood.

What I claim and desire to protect by Letters Patent is:

1. The method of separating the resin acids from tall oil which comprises dissolving tall oil in an organic solvent selected from the group consisting of acetone, isopropanol, Hi-Flash naphtha and gasoline, and precipitating the resin acids from the resulting solution at a temperature between about $-10°$ C. and about $50°$ C. with a primary organic amine selected from the group consisting of cyclohexylamine, p-dodecahydroxyenylamine and 2-amino-2-methyl-1-propanol.

2. The method of separating the resin acids from tall oil which comprises dissolving tall oil in an organic solvent selected from the group consisting of acetone, isopropanol, Hi-Flash naphtha and gasoline, precipitating the resin acids from the resulting solution at a temperature between about $-10°$ C. and about $50°$ C. with a primary organic amine selected from the group consisting of cyclohexylamine, p-dodecahydroxyenylamine and 2-amino-2-methyl-1-propanol, separating the resin acid amine salts so formed from said solution, and decomposing said salts to liberate the free resin acids.

3. The method of separating the resin acids from tall oil which comprises extracting the neutral bodies from a tall oil soap solution with a water-immiscible solvent, acidifying said soap solution with an acid, dissolving the resin and fatty acids so formed in an organic solvent selected from the group consisting of acetone, isopropanol, Hi-Flash naphtha and gasoline, and precipitating the resin acids from the resulting solution at a temperature between about $-10°$ C. and about $50°$ C. with a primary organic amine selected from the group consisting of cyclohexylamine, p-dodecahydroxenylamine and 2-amino-2-methyl-1-propanol.

4. The method of separating the resin acids from tall oil which comprises dissolving tall oil in an organic solvent selected from the group consisting of acetone, isopropanol, Hi-Flash naphtha and gasoline, and precipitating the resin acids from the resulting solution at a temperature between about $10°$ C. and about $30°$ C. with a primary organic amine selected from the group consisting of cyclohexylamine, p-dodecahydroxenylamine and 2-amino-2-methyl-1-propanol.

5. The method of separating the resin acids from tall oil which comprises dissolving tall oil in acetone and precipitating the resin acids from the acetone solution at a temperature between about $-10°$ C. and about $50°$ C. with a primary organic amine selected from the group consisting of cyclohexylamine, p-dodecahydroxenylamine and 2-amino-2-methyl-1-propanol.

6. The method of separating the resin acids from tall oil which comprises dissolving tall oil in acetone and prepitating the resin acids from the acetone solution with cyclohexylamine at a temperature between about $-10°$ C. and about $50°$ C.

7. The method of separating the resin acids from tall oil which comprises dissolving tall oil in acetone and precipitating the resin acids from the acetone solution with cyclohexyalmine at a temperature between about $10°$ C. and about $30°$ C.

8. The method of separating the resin acids from tall oil which comprises dissolving tall oil in acetone and precipitating the resin acids from the acetone solution with p-dodecahydroxenylamine at a temperature between about $-10°$ C. and about $50°$ C.

9. The method of separating the resin acids from tall oil which comprises dissolving tall oil in acetone and precipitating the resin acids from the acetone solution with 2-amino-2-methyl-1-propanol at a temperature between about $-10°$ C. and about $50°$ C.

GEORGE C. HARRIS.

Disclaimer 2,419,211.—*George C. Harris*, Wilmington, Del. TALL OIL TREATMENT. Patent dated Apr. 22, 1947. Disclaimer filed Nov. 30, 1949, by the assignee, *Hercules Powder Company*.

Hereby disclaims claims 6 and 7 of said patent; also disclaims all methods of separating the resin acids from tall oil covered by claims 1 to 5, inclusive, except those in which a primary amine selected from the group consisting of p-dodecahydroxenylamine and 2-amino-2-methyl-1-propanol is employed.

[*Official Gazette December 27, 1949.*]